United States Patent
Nonaka et al.

(10) Patent No.: US 9,416,235 B2
(45) Date of Patent: Aug. 16, 2016

(54) LONG-FIBER-REINFORCED THERMOPLASTIC RESIN PREFORM AND FIBER-REINFORCED RESIN COMPACT USING SAME

(71) Applicant: NITTO BOSEKI CO., LTD., Fukushima (JP)

(72) Inventors: Takashi Nonaka, Fukushima (JP); Hiroyasu Aihara, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 14/362,678

(22) PCT Filed: Dec. 4, 2012

(86) PCT No.: PCT/JP2012/081390
§ 371 (c)(1),
(2) Date: Jun. 4, 2014

(87) PCT Pub. No.: WO2013/084892
PCT Pub. Date: Jun. 13, 2013

(65) Prior Publication Data
US 2014/0364554 A1 Dec. 11, 2014

(30) Foreign Application Priority Data

Dec. 6, 2011 (JP) ................................. 2011-267372

(51) Int. Cl.
| | | |
|---|---|---|
| *C08J 5/04* | (2006.01) | |
| *C08K 3/40* | (2006.01) | |
| *B29B 9/14* | (2006.01) | |
| *B29B 11/02* | (2006.01) | |
| *C03C 3/087* | (2006.01) | |
| *C03C 13/00* | (2006.01) | |
| *C03C 25/16* | (2006.01) | |
| *C03C 25/32* | (2006.01) | |

(52) U.S. Cl.
CPC . *C08J 5/043* (2013.01); *B29B 9/14* (2013.01); *B29B 11/02* (2013.01); *C03C 3/087* (2013.01); *C03C 13/00* (2013.01); *C03C 25/16* (2013.01); *C03C 25/328* (2013.01); *C08K 3/40* (2013.01); *C08J 2300/22* (2013.01)

(58) Field of Classification Search
CPC .................................. C08K 3/40; C03C 3/087
See application file for complete search history.

(56) References Cited

U.S. PATENT DOCUMENTS

| 7,799,713 | B2 * | 9/2010 | Hofmann et al. ................ 501/36 |
| 7,799,731 | B2 * | 9/2010 | Hiraoka et al. ................ 502/350 |
| 8,563,450 | B2 | 10/2013 | Hofmann et al. |
| 8,841,222 | B2 | 9/2014 | Nonaka et al. |
| 2006/0204763 | A1 | 9/2006 | Hartman et al. |
| 2010/0009158 | A1 | 1/2010 | Imaizumi et al. |
| 2011/0039681 | A1 | 2/2011 | Lecomte |
| 2012/0163987 | A1 * | 6/2012 | Hausrath et al. .......... 416/241 R |
| 2014/0343211 | A1 * | 11/2014 | Nonaka et al. ................ 524/433 |

FOREIGN PATENT DOCUMENTS

| EP | 2581350 | 4/2013 |
| JP | S58-064243 A | 4/1983 |
| JP | 2003171143 A | 6/2003 |
| JP | 2009-514772 A | 4/2009 |
| JP | 2009-514773 A | 4/2009 |
| JP | 2009-242621 A | 10/2009 |
| TW | 200728226 A | 8/2007 |
| WO | 2007/055964 A2 | 5/2007 |
| WO | 2007/055968 A2 | 5/2007 |
| WO | WO 2011/155362 A1 * | 12/2011 |
| WO | 2012087313 | 6/2012 |

OTHER PUBLICATIONS

Machine translation of JP 2009-242621 A, published as Oct. 22, 2009.*
Extended European Search Report dated Oct. 13, 2015 issued in the counterpart European Application No. 12 854 881.5.

* cited by examiner

*Primary Examiner* — Vickey Nerangis
(74) *Attorney, Agent, or Firm* — Carrier Blackman & Associates, P.C.; Joseph P. Carrier; Fulchand P. Shende

(57) ABSTRACT

Provided is a long-fiber-reinforced thermoplastic resin preform including glass fibers excellent in strength and modulus of elasticity and easily produced and a long-fiber-reinforced resin compact excellent in strength and modulus of elasticity. The long-fiber-reinforced thermoplastic resin preform is produced by cutting to a predetermined length glass fiber bundles impregnated with a thermoplastic resin and holding the thermoplastic resin around the glass fiber bundles, and includes the glass fiber bundles as long fiber bundles. The glass fiber bundles are formed by bundling glass fibers. The glass fibers have a composition wherein the content of $SiO_2$ is 57.0 to 63.0% by mass, the content of $Al_2O_3$ is 19.0 to 23.0% by mass, the content of MgO is 10.0 to 15.0% by mass and the content of CaO is 5.5 to 11.0% by mass, and the ratio MgO/CaO is 0.8 to 2.0.

4 Claims, No Drawings

LONG-FIBER-REINFORCED THERMOPLASTIC RESIN PREFORM AND FIBER-REINFORCED RESIN COMPACT USING SAME

TECHNICAL FIELD

The present invention relates to long-fiber-reinforced thermoplastic resin preforms, and a fiber-reinforced resin compact using the same.

BACKGROUND ART

Fiber-reinforced resin compacts are light in weight and excellent in strength, and hence have hitherto been favorably used for, for example, exterior finish of vehicles and ships. Recently, long-fiber-reinforced resin compacts have been known which are excellent in strength and modulus of elasticity due to the inclusion of reinforcing fibers having long filler length, and such compacts are often used for bumpers and bodies of vehicles. The long-fiber-reinforced resin compacts are generally formed by using long-fiber-reinforced thermoplastic resin preforms with an injection molding method or a stamping molding method.

Here, the long-fiber-reinforced thermoplastic resin preforms have pellet-like shapes or sheet-like shapes, and include glass fiber bundles cut to predetermined lengths as long fibers, wherein a thermoplastic resin is impregnated in the glass fiber bundles and at the same time allowed to be held around the glass fiber bundles. Such a long-fiber-reinforced thermoplastic resin preform can be produced as follows.

First, a glass composition as a raw material for the glass fibers is melted into a molten glass, and glass fiber bundles are prepared by bundling the continuous glass fibers spun from the resulting molten glass. Then, by allowing the glass fiber bundles to pass through the molten thermoplastic resin, the thermoplastic resin is impregnated in the glass fiber bundles and at the same time allowed to be held around the glass fiber bundles. Subsequently, by cooling the glass fiber bundles impregnated with the thermoplastic resin and allowed to hold the thermoplastic resin around the glass fiber bundles and by cutting the cooled glass fiber bundles to a predetermined length, the long-fiber-reinforced thermoplastic resin preform having a pellet-like shape can be obtained. By dispersing thinly and uniformly the pellet-like long-fiber-reinforced thermoplastic resin preform and by thermally fusing the resulting dispersed resin preform, a sheet-like long-fiber-reinforced thermoplastic resin preform can be obtained.

As the glass fibers, usually glass fibers composed of E-glass are used; however, glass fibers composed of E-glass may not attain sufficient strength and sufficient modulus of elasticity. In this connection, glass fibers composed of S-glass, in place of E-glass, are known to have more excellent strength than the glass fibers composed of E-glass.

The glass fibers composed of S glass has a composition in which the content of $SiO_2$ is about 64.0 to 66.0% by mass, the content of $Al_2O_3$ is about 24.0 to 26.0% by mass and the content of MgO is about 9.0 to 11.0% by mass, based on the total amount of the glass fibers. However, when a glass composition as the raw material for S-glass is melted into molten glass, and glass fibers are obtained by spinning the molten glass, S-glass has a problem that the 1000-poise temperature of the molten glass is extremely high, and additionally the difference between the 1000-poise temperature of the molten glass and the liquid phase temperature of the molten glass is small.

When the 1000-poise temperature of the molten glass is high, a high temperature is required in the process of melting the glass and the process of forming fibers from the glass, and hence a load due to thermal load on the production facilities is large. When the difference between the 1000-poise temperature of the molten glass and the liquid phase temperature of the molten glass is small, in the process during which the molten glass is spun and then cooled to be glass fibers, the glass fibers tend to undergo crystallization (devitrification) even under the effect of slight temperature decrease and a problem of breakage of glass fibers or the like tends to occur. Consequently, when the glass composition as the raw material for S-glass is melted into a molten glass, it is difficult to stably spin glass fibers from the resulting molten glass, and accordingly, it is also difficult to produce the long-fiber-reinforced thermoplastic resin preform by using S-glass.

The "1000-poise temperature" is an index of the standard when a molten glass is spun into fibers and means the temperature at which the viscosity of the molten glass comes to be 1000 poises. The "liquid phase temperature" means the temperature at which crystals start to precipitate when the temperature of the molten glass is decreased. The temperature range (working temperature range) between the 1000-poise temperature and the liquid phase temperature is a standard indicating the easiness in spinning, and the wider the range, the more easily the stable spinning is performed. The "devitrification" is the phenomenon that crystals precipitate when the temperature of the molten glass is decreased.

Accordingly, a glass composition has been proposed in which the composition of the glass composition as the raw material for S-glass is improved in such a way that the glass composition includes CaO as well as $SiO_2$, $Al_2O_3$ and MgO. As the foregoing glass composition, a glass composition is known which allows the spinning to be easily performed at relatively low temperatures while the working temperature range is being maintained, for example, by decreasing the viscosity on the basis of the decrease of the 1000-poise temperature (see. Patent Literature 1). As the foregoing glass composition, a glass composition is also known in which the difference between the 1000-poise temperature and the liquid phase temperature is large (see, Patent Literature 2).

CITATION LIST

Patent Literature

Patent Literature 1: Japanese Unexamined Patent Application Publication No. 62-001337
Patent Literature 2: Japanese Unexamined Patent Application No. 2009-514773

SUMMARY OF INVENTION

Technical Problem

However, the glass composition described in Patent Literature 1 including CaO as well as $SiO_2$, $Al_2O_3$ and MgO tends to undergo devitrification when melted into a molten glass, mid it is difficult to stably spin the resulting molten glass. When the glass composition described in Patent Literature 2 is melted into a molten glass, the 1000-poise temperature of the molten glass is high, and hence it is difficult to obtain glass fibers themselves. Accordingly, there is an inconvenience that it is difficult to produce a long-fiber-reinforced thermoplastic resin preform including glass fibers excellent in strength and modulus of elasticity.

An object of the present invention is to provide a long-fiber-reinforced thermoplastic resin preform including glass fibers excellent in strength and modulus of elasticity and being easily produced, by solving such an inconvenience.

Another object of the present invention is to provide a long-fiber-reinforced resin compact excellent in strength and modulus of elasticity, using the long-fiber-reinforced thermoplastic resin preform.

Solution to Problem

In order to achieve such objects as described above, the present invention provides a long-fiber-reinforced thermoplastic resin preform which is produced by cutting to a predetermined length glass fiber bundles impregnated with a thermoplastic resin and at the same time holding the thermoplastic resin around the glass fiber bundles, mid which includes the glass fiber bundles as long fiber bundles, wherein the glass fiber bundles impregnated with a thermoplastic resin and at the same time holding the thermoplastic resin around the glass fiber bundles are obtained by a process wherein a glass composition as a raw material for glass fibers is melted into a molten glass, the continuous glass fibers spun from the molten glass are bundled into glass fiber bundles, and a thermoplastic resin is impregnated in the glass fiber bundles and at the same time allowed to be held around the glass fiber bundles, wherein the glass fibers have a composition wherein a content of $SiO_2$ is 57.0 to 63.0% by mass, a content of $Al_2O_3$ is 19.0 to 23.0% by mass, a content of MgO is 10.0 to 15.0% by mass and a content of CaO is 5.5 to 11.0% by mass, based on a total amount of the glass fibers, and a ratio of the content of MgO to the content of CaO, MgO/CaO falls within a range from 0.8 to 2.0. The long-fiber-reinforced thermoplastic resin preform may be either a pellet-like preform or a sheet-like preform.

According to the present invention, the glass composition as a raw material for the glass fibers having the foregoing composition is melted into a molten glass. Continuous glass fibers spun from the molten glass are bundled into glass fiber bundles, and a thermoplastic resin is impregnated in the glass fiber bundles and at the same time allowed to be held mound the glass fiber bundles. Then, the glass fiber bundles impregnated with the thermoplastic resin and at the same time holding the thermoplastic resin around the glass fiber bundles are cut to a predetermined length, and thus, a long-fiber-reinforced thermoplastic resin preform including glass fibers excellent in strength and modulus of elasticity can be easily obtained.

In the glass fibers, when the content of $SiO_2$ is less than 57.0% by mass based on the total amount of the glass fibers, sufficient mechanical strength cannot be obtained as the glass fibers, and when the content of $SiO_2$ exceeds 63.0% by mass based on the total amount of the glass fibers, the 1000-poise temperature and the liquid phase temperature of the molten glass obtained from the glass composition as the raw material for the glass fibers are high.

In the glass fibers, when the content of $Al_2O_3$ is less than 19.0% by mass based on the total amount of the glass fibers, sufficient modulus of elasticity cannot be obtained, and when the content of $Al_2O_3$ exceeds 23.0% by mass based on the total amount of the glass fibers, the liquid phase temperature of the molten glass obtained from the glass composition as the raw material for the glass fibers is high.

In the glass fibers, when die content of MgO is less than 10.0% by mass based, on the total amount of the glass fibers, sufficient modulus of elasticity cannot be obtained, and when the content of MgO exceeds 15.0% by mass based on the total amount of the glass fibers, the liquid phase temperature of the molten glass obtained from the glass composition as the raw material for the glass fibers is high.

In the glass fibers, when the content of CaO is less than 5.5% by mass based on the total amount of the glass fibers, the liquid phase temperature of the glass composition is high, and when the content of CaO exceeds 11.0% by mass based on the total amount of the glass fibers, the 1000-poise temperature and the liquid phase temperature of the molten glass obtained from the glass composition as the raw material for the glass fibers are high.

In the glass fibers, when the ratio of the content of MgO to the content of CaO, MgO/CaO is less than 0.8, sufficient modulus of elasticity cannot be obtained, and when the ratio MgO/CaO exceeds 2.0, the liquid phase temperature of the molten glass obtained from the glass composition as the raw material for the glass fibers is high.

When the glass fibers tend to undergo devitrification at the time of spinning the molten glass obtained from the glass composition as the raw material for the glass fibers, a problem of breakage of glass fibers or the like occurs. However, in the present invention, the glass fibers have the foregoing composition, and hence the crystal precipitating first, when the molten glass is decreased in temperature (the initial phase of devitrification) is a single crystal of cordierite or a mixed crystal composed of cordierite and anorthite. Consequently, the molten glass finds difficulty in crystal precipitation at the liquid phase temperature as compared to the case where the initial phase of devitrification is crystals other than the foregoing crystals. Accordingly, at the time of spinning the molten glass obtained by melting the glass composition as the raw material for the glass fibers, the occurrence of a trouble such as the breakage of the glass fibers can be suppressed, and stable spinning can be performed.

In the present invention, preferably in the molten glass, the 1000-poise temperature is 1350° C. or lower, mid the difference between the 1000-poise temperature and the liquid phase temperature is 50° C. or more. The molten glass can be easily obtained when the 1000-poise temperature is 1350° C. or lower. In the molten glass, when the difference between the 1000-poise temperature and the liquid phase temperature is 50° C. or more, the working temperature range is widened and stable spinning can be performed.

In the present invention, the strength of the glass fibers is preferably 4.0 GPa or more and the modulus of elasticity of the glass fibers is preferably 85 GPa or more. In the case where the long-fiber-reinforced thermoplastic resin preform includes the glass fibers having the strength and the modulus of elasticity failing within the foregoing ranges, when the long-fiber-reinforced thermoplastic resin preform is molded by an injection molding method or a stamping molding method, a long-fiber-reinforced resin compact excellent in strength and modulus of elasticity can be obtained.

Accordingly, the long-fiber-reinforced thermoplastic resin compact of the present invention is characterized by being formed from the long-fiber-reinforced thermoplastic resin preform of the present invention by an injection molding method or a stamping molding method.

DESCRIPTION OF EMBODIMENT

Next, the embodiment of the present invention is described in more detail.

The long-fiber-reinforced thermoplastic resin preform of the present embodiment is produced by cutting to a predetermined length glass fiber bundles impregnated with a thermoplastic resin and at the same time holding the thermoplastic resin around the glass fiber bundles, and includes the glass fiber bundles as long fiber bundles. The long-fiber-reinforced thermoplastic resin preform may be either a pellet-like preform or a sheet-like preform.

The glass fiber bundles are obtained by bundling the continuous glass fibers spun from the molten glass prepared by melting the glass composition as a raw material for the glass fibers. The glass fibers have the same composition as that of the glass composition as the raw material and that of the molten glass obtained by melting the glass composition. As the glass composition, glass cutlets or glass batch can be used. The molten glass can be obtained by a method of re-melting the glass cullets or by a method of directly melting the glass batch.

The glass fibers themselves can be produced from the molten glass by a heretofore known method. According to the heretofore known method, the molten glass was drawn and spun from tens to thousands of platinum alloy nozzles called a bushing, the resulting fibers are taken up at a high speed, and thus glass fibers having the fiber diameter falling within a range from 3 to 30 μm can be obtained.

The glass fibers drawn from the platinum alloy nozzles are bundled into glass fiber bundles (glass fiber strands) each including 50 to 8000 fibers bundled by adding a sizing agent to the glass fibers. The glass fiber bundles can be used as a single yarn wound around a paper core or a plastic core or a multiple wound yarn made by bundling a plurality of single yarns wound around a paper core or a plastic core.

The glass fiber bundles can be impregnated with a thermoplastic resin by, for example, a pultrusion molding method and hold the thermoplastic resin around the glass fiber bundles. In the pultrusion molding method, as one method, the glass fiber bundles are introduced into a cross-head die (impregnation die), and the glass fiber bundles are made to pass through a thermoplastic resin melted in a vessel equipped with a fiber-opening bar. As another method, the glass fiber bundles and thermoplastic resin fiber bundles are doubled, and then the glass fiber bundles and the thermoplastic fiber bundles may be made to pass through a vessel equipped with a fiber-opening bar, heated to the fusion temperature of the thermoplastic resin.

Consequently, the thermoplastic resin is impregnated between the glass fibers forming the glass fiber bundles and at the same time held around the glass fiber bundles. The glass fiber bundles impregnated with the thermoplastic resin and holding the thermoplastic resin around the glass fiber bundles are cooled, and then cut to a predetermined length such as a length falling within a range from 3.0 to 50 mm; thus, a pellet-like long-fiber-reinforced thermoplastic resin preform can be obtained.

By dispersing thinly and uniformly the pellet-like long-fiber-reinforced thermoplastic resin preform and by thermally fusing the resulting dispersed resin preform, a sheet-like long-fiber-reinforced thermoplastic resin preform can be obtained.

The long-fiber-reinforced thermoplastic resin preform of the present embodiment preferably includes the glass fibers, for example, in a content falling within a range from 10 to 90% by mass based on the total amount of foe long-fiber-reinforced thermoplastic resin preform.

The glass fibers forming the glass fiber bundles have a composition wherein the content of $SiO_2$ is 57.0 to 63.0% by mass, the content of $Al_2O_3$ is 19.0 to 23.0% by mass, the content of MgO is 10.0 to 15.0% by mass and the content of CaO is 5.5 to 11.0% by mass, based on the total amount of the glass fibers, and the ratio of the content of MgO to the content of CaO, MgO/CaO falls within a range from 0.8 to 2.0.

Consequently, at the time of spinning the molten glass obtained by melting the glass composition as the raw material for the glass fibers, the working temperature range can be widened and at the same time the occurrence of a trouble such as the breakage of the spun glass fibers can be suppressed, and stable spinning can be performed.

In the molten glass, specifically the 1000-poise temperature is 1350° C. or lower, and the difference between the 1000-poise temperature and the liquid phase temperature is 50° C. or more.

The glass fibers having the foregoing composition have a strength of 4.0 GPa or more and a modulus of elasticity of 85 GPa or more.

As described above, the long-fiber-reinforced thermoplastic resin preform of the present embodiment uses the glass fiber bundles formed of the glass fibers and are produced by, for example, a pultrusion molding method, and in the pultrusion molding method, when the glass fiber bundles are drawn from a cross-head die, the viscosity of the thermoplastic resin is high, and the fiber-opening bar squeezes the glass fiber bundles. Accordingly, a large load is applied to the glass fiber bundles, thus the filaments of the glass fibers are sometimes broken and become fluffy, and causes problems of the quality degradation of the products and the degradation of the production efficiency due to the readjustment of the production conditions.

However, the glass fibers having the foregoing composition have a strength of 4.0 GPa or more and a modulus of elasticity of 85 GPa or more and are excellent in flex resistance, and hence the breakage and fluffing of the filaments of the glass fibers can be suppressed to enable the quality and the production efficiency to be improved.

In the long-fiber-reinforced thermoplastic resin preform of the present embodiment, in the glass fibers, when the content of $SiO_2$ is less than 57.0% by mass based on the total amount of the glass fibers, sufficient mechanical strength cannot be obtained as the glass fibers, and when the content of $SiO_2$ exceeds 63.0% by mass based on the total amount of the glass fibers, the 1000-poise temperature and the liquid phase temperature of the molten glass obtained from the glass composition as the raw material for the glass fibers are high. In order to set the 1000-poise temperature of the molten glass composition obtained from the glass composition as the raw material for the glass fibers at 1350° C. or lower, the content of $SiO_2$ preferably falls within a range from 57.0 to 62.0% by mass and more preferably falls within a range from 57.0 to 61.0% by mass based on the total amount of the glass fibers.

In the glass fibers, when the content of $Al_2O_3$ is less than 19.0% by mass based on the total amount of the glass fibers, sufficient modulus of elasticity cannot be obtained, and when the content of $Al_2O_3$ exceeds 23.0% by mass, the liquid phase temperature of the molten glass obtained from the glass composition as the raw material for the glass fibers is high. In order to obtain excellent modulus of elasticity in the glass fibers and at the same time widen the working temperature range of the molten glass by decreasing the liquid phase temperature of the molten glass, the content of $Al_2O_3$ preferably falls within a range from 19.5 to 22.0% by mass and more preferably fells within a range from 20.0 to 21.0% by mass based on the total amount of the glass fibers.

In the glass fibers, because the content of $Al_2O_3$ falls within the range from 19.0 to 23.0% by mass, is in the vicinity of 19.0 to 22.0% by mass based on the total amount of the glass fibers, the initial phase of devitrification in the molten glass obtained from the glass composition as the raw material for the glass fibers can be made to be a single crystal of cordierite or a mixed crystal composed of cordierite and anorthite. When the content of $Al_2O_3$ is less than 19.0% by mass based on the total amount of the glass fibers, the initial phase of devitrification in the molten glass obtained from the glass composition as the raw material for the glass fibers may not be made to be a single crystal of cordierite or a mixed crystal composed of cordierite and anorthite. Accordingly, in the glass fibers, for the purpose of allowing the initial phase of devitrification in the molten glass obtained from the glass composition as the raw material for the glass fibers to be a single crystal of cordierite or a mixed crystal composed of cordierite and anorthite, the content of $Al_2O_3$ preferably falls within a range in the vicinity of 19.0% by mass to 22.0% by mass based on the total amount of the glass fibers.

The content of $SiO_2$/the content of $Al_2O_3$ is preferably 2.6 to 3.3 in terms of weight ratio. This is because such a range as described above widens the working temperature range at the time of production of the glass fibers, and allows the glass fibers to have sufficient modulus of elasticity. The content of $SiO_2$/the content of $Al_2O_3$ is more preferably 2.7 to 3.2 in terms of weight ratio. This is because the weight ratio of the content of $SiO_2$/the content of $Al_2O_3$ of 3.2 or less yields the glass fibers having high modulus of elasticity. This is also because the weight ratio of 2.7 or more decreases the liquid phase temperature and at the same time allows the devitrification phenomenon to be suppressed.

In the glass fibers, when the content of MgO is less man 10.0% by mass based on the total amount of the glass fibers, sufficient modulus of elasticity cannot be obtained, and when the content of MgO exceeds 15.0% by mass based on the total amount of the glass fibers, the liquid phase temperature of the molten glass obtained from the glass composition as the raw material for the glass fibers is high. In order to obtain excellent modulus of elasticity in the glass fibers and at the same time widen the working temperature range of the molten glass by decreasing the liquid phase temperature of the molten glass, the content of MgO preferably fells within a range from 11.0 to 14.0% by mass and more preferably fells within a range from 11.5 to 13.0% by mass based on the total amount of the glass fibers.

In the glass fibers, when the content of CaO is less than 5.5% by mass based on the total amount of the glass fibers, the liquid phase temperature of the molten glass obtained from the glass composition as the raw material for the glass fibers is high, and when the content of CaO exceeds 11.0% by mass based on the total amount of the glass fibers, the 1000-poise temperature and the liquid phase temperature of the molten glass are high. In order to widen the working temperature range of the molten glass by decreasing the 1000-poise temperature and the liquid phase temperature of the molten glass, the content of CaO preferably falls within a range from 6.0 to 10.5% by mass and more preferably falls within a range from 7.0 to 10.0% by mass based on the total amount of the glass fibers.

When the total content of $SiO_2$, $Al_2O_3$, MgO and CaO is less than 99.0% by mass, the content of other impurity components is relatively larger, consequently sufficient modulus of elasticity cannot be obtained in the glass fibers, and sufficient working temperature range cannot be ensured in the molten glass obtained from the glass composition as the raw material for the glass fibers. For the purpose of obtaining excellent modulus of elasticity in the glass fibers and at the same time ensuring sufficient working temperature range in the molten glass obtained from the glass composition as the raw material for the glass fibers, the total content of $SiO_2$, $Al_2O_3$, MgO and CaO preferably falls within a range of 99.5% by mass or more, and more preferably falls within a range of 99.8% by mass or more based on the total amount of the glass fibers.

In the glass fibers, when the ratio of the content of MgO to the content of CaO, MgO/CaO is less than 0.8, sufficient modulus of elasticity cannot be obtained, and when the ratio MgO/CaO exceeds 2.0, the liquid phase temperature of the molten glass obtained from the glass composition as the raw material for the glass fibers is high. In order to obtain excellent modulus of elasticity in the glass fibers and at the same time widen the working temperature range of the molten glass by decreasing the liquid phase temperature of the molten glass, the ratio of the content of MgO to the content of CaO, MgO/CaO preferably falls within a range from 1.0 to 1.8.

The glass fibers include, as the basic composition, $SiO_2$, $Al_2O_3$, MgO and CaO in the contents falling within the foregoing ranges; however, the glass fibers may also include other components inevitably mixed in the glass fibers, for example, because of being included in the raw materials for the respective components. Examples of the other components include: alkali metal oxides such as $Na_2O$, $Fe_2O_3$, $TiO_2$, $ZrO_2$, $MoO_3$ and $Cr_2O_3$. The content of the other components is preferably less than 1.0% by mass, more preferably less than 0.5% by mass and furthermore preferably less than 0.2% by muss based on the total amount of the glass fibers.

In the long-fiber-reinforced thermoplastic resin preform of the present embodiment, examples of the thermoplastic resin include: polyethylene resin, polypropylene resin, polystyrene resin, polyurethane resin, acrylonitrile/butadiene/styrene (ABS) resin, methacrylic resin, vinyl chloride resin, polyamide resin, polyacetal resin, polyethylene terephthalate (PET) resin, polybutylene terephthalate (PBT) resin, polyphenylene sulfide (PPS) resin, polyether ether ketone (PEEK) resin, liquid crystal polymer (LCP) resin, fluororesin, polyether imide (PEI) resin, polyarylate (PAR) resin, polysulfone (PSF) resin, polyethersulfone (PES) resin and polyamide-imide (PAI) resin. The thermoplastic resin may be used each alone or in combinations of two or more thereof.

Next, the long-fiber-reinforced thermoplastic resin compact of the present embodiment can be obtained by using the long-fiber-reinforced thermoplastic resin preform and by molding by an injection molding method or a stamping molding method. The long-fiber-reinforced thermoplastic resin compact of the present embodiment can obtain excellent strength and excellent modulus of elasticity by using the long-fiber-reinforced thermoplastic resin preform. The long-fiber-reinforced thermoplastic resin compact of the present embodiment can obtain more excellent strength by using the long-fiber-reinforced thermoplastic resin preform because the residual fiber length is made longer.

The long-fiber-reinforced thermoplastic resin compact of the present embodiment can be used in applications to, for example, vehicle structural members, household electric appliance housing members, railroad components, ship components, house appliances, civil engineering-building components, safety appliances, sporting goods and general industrial products.

Examples of the vehicle structural members may include: underbody covers, sheets, front-end modules, door module, bumper team, hatch backdoor, instrument panel structural components, spare wheel pans, knee protectors, engine peripheral members, impact absorbing doors, crash elements, electric vehicles, compressed natural gas (CNG) cylinders and bumpers.

Examples of the household electric appliance housing members may include cell phone enclosures, personal computer enclosures, digital camera enclosures, digital video enclosures and game machine enclosures.

Examples of the railroad components may include ceiling members, seats and railroad crossing bars.

Examples of the ship component may include pleasure boats, water bikes and liquefied natural gas (LNG) tanks.

Examples of the house appliances may include bathtub reinforcing members, unit bath ceiling members and office furniture.

Examples of the civil engineering-building components may include house base formworks, block formworks, building structure reinforcing members and scaffolding members.

Examples of the safety appliances may include safety shoes, helmets and protectors.

Examples of the sporting goods may include rackets, bats and shoes.

Examples of the general industrial products may include pipes, spring elements and ceiling members of large machines.

Next, Examples and Comparative Example of the present invention are presented.

EXAMPLES

Example 1

In present Example, first a glass composition was obtained by mixing glass raw materials in such a way that the content of $SiO_2$ was 60.2% by mass, the content of $Al_2O_3$ was 20.1% by mass, the content of MgO was 10.1% by mass, the content of CaO was 9.5% by mass and the content of $Fe_2O_3$ was 0.1% by mass, based on the total amount of the glass composition. In the glass composition, the ratio of the content of MgO to the content of CaO, MgO/CaO is 1.1. The composition of the glass composition is shown in Table 1.

Next, the glass composition was melted in the platinum boat, and while the temperature of the molten glass was being varied, the viscosity of the molten glass was continuously measured by using a rotary B-type viscometer, and the temperature corresponding to the viscosity of 1000 poises was taken as the 1000-poise temperature. It is to be noted that the viscosity measurement was performed according to JIS Z8803-1991.

Next, crushed glass having the composition was placed in a platinum boat and heated in a tubular electric furnace provided with a temperature gradient, covering a range of from 1000 to 1500° C., and the temperature at which crystals started to precipitate was taken as the liquid phase temperature.

Next, the working temperature range was derived as the difference between the 1000-poise temperature and the liquid phase temperature (1000-poise temperature—liquid phase temperature). The 1000-poise temperature, the liquid phase temperature and the working temperature range are shown in Table 2.

Next, the glass composition was heated for melting to a temperature equal to or higher than the 1000-poise temperature, and then the glass composition was allowed to stand for 6 hours at temperatures lower by 100 to 300° C. than the liquid phase temperature. Thus, the appearance of the crystals developed on the surface and in the interior of the glass composition was observed, and the devitrification resistance was evaluated on the basis of the three grades A, B and C. A indicates that no crystals precipitate, B indicates that crystals precipitate on a portion of the surface and C indicates that crystals precipitate on the surface and in the interior.

Next, the initial phase portion of the crystals precipitated in the sample used for the measurement of the liquid phase temperature was pulverized, the resulting powder was analyzed with an X-ray diffractometer, and thus the identification of the crystal species of the initial phase of devitrification was performed. The evaluation of the devitrification resistance and the crystal species of the initial phase of devitrification are shown in Table 2.

Next, the glass composition was melted into a molten glass, and the resulting molten glass was spun to yield glass fibers of which the diameter is 13 μm. The obtained glass fibers had the same composition as the composition of the glass composition.

Next, by using the monofilament of the glass fibers as a sample, a tensile test was performed and the strength and the modulus of elasticity of the glass fibers were derived. The strength and the modulus of elasticity of the glass fibers are shown in Table 2.

Next, the glass composition was melted into a molten glass, the glass fibers of 13 μm in fiber diameter were spun from the molten glass, the resulting glass fibers were bundled into glass fiber bundles, and a pellet-like long-fiber-reinforced thermoplastic resin preform (hereinafter, abbreviated as long-fiber-reinforced thermoplastic resin pellet) was produced by using the obtained glass fiber bundles and by molding by a pultrusion molding method. As the thermoplastic resin, polyamide 66 resin was used. The long-fiber-reinforced thermoplastic resin pellet obtained in present Example included the glass fibers in a content of 40% by mass based on the total amount of the pellet and had a length of 10 mm. When the long-fiber-reinforced thermoplastic resin pellet was produced, the fluffing due to the breakage of the filaments was visually evaluated. The result thus obtained is shown in Table 3.

Next, by using the long-fiber-reinforced thermoplastic resin pellet obtained in present Example, a plate-like long-fiber-reinforced thermoplastic resin compact having a size of 80 mm×10 mm×4 mm was produced by an injection molding method. By using the long-fiber-reinforced thermoplastic resin compact as a sample, a three-point bending test was performed, and the strength and the modulus of elasticity of the long-fiber-reinforced thermoplastic resin compact were derived. The results thus obtained are shown in Table 3.

Example 2

In present Example, first a glass composition was obtained by mixing glass raw materials in such a way that the content of $SiO_2$ was 59.2% by mass, the content of $Al_2O_3$ was 20.1% by mass, the content of MgO was 12.6% by mass, the content of CaO was 8.0% by mass and the content of $Fe_2O_3$ was 0.1% by mass, based on the total amount of the glass composition. In the glass composition, the ratio of the content of MgO to the content of CaO, MgO/CaO is 1.6. The composition of the glass composition obtained in present Example is shown in Table 1.

Next, the 1000-poise temperature and the liquid phase temperature were determined, and the working temperature range was derived in exactly the same manner as in Example 1 except that the glass composition obtained in present Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, and the resulting molten glass was spun to yield glass fibers.

Next, the strength and the modulus of elasticity were derived in exactly the same manner as in Example 1 except that the glass fibers obtained in present Example were used. The results thus obtained are shown in Table 2.

Next, a long-fiber-reinforced thermoplastic resin pellet was produced in exactly the same manner as in Example 1 except that the glass composition obtained in present Example was used. The long-fiber-reinforced thermoplastic resin pellet obtained in present Example included the glass fibers in a content of 40% by mass based on the total amount of the pellet, and had a length of 10 mm. When the long-fiber-reinforced thermoplastic resin pellet was produced, the fluffing due to the breakage of the filaments was visually evaluated. The result thus obtained is shown in Table 3.

Next, by using the long-fiber-reinforced thermoplastic resin pellet obtained in present Example, a plate-like long-fiber-reinforced thermoplastic resin compact having the same size as in Example 1 was produced by an injection molding method. By using the long-fiber-reinforced thermoplastic resin compact as a sample, a three-point bending test was performed, and the strength and the modulus of elasticity of the long-fiber-reinforced thermoplastic resin compact were derived. The results thus obtained are shown in Table 3.

Example 3

In present Example, first a glass composition was obtained by mixing glass raw materials in such a way that the content of $SiO_2$ was 58.2% by mass, the content of $Al_2O_3$ was 20.7% by mass, the content of MgO was 12.0% by mass, the content of CaO was 9.0% by mass and the content of $Fe_2O_3$ was 0.1% by mass, based on the total amount of the glass composition. In the glass composition, the ratio of the content of MgO to the content of CaO, MgO/CaO is 1.3. The composition of the glass composition obtained in present Example is shown in Table 1.

Next, the 1000-poise temperature and the liquid phase temperature were determined, and the working temperature range was derived in exactly the same manner as in Example 1 except that the glass composition obtained in present Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, and the resulting molten glass was spun to yield glass fibers. Next, the strength and the modulus of elasticity were derived in exactly the same manner as in Example 1 except that the glass fibers obtained in present Example were used. The results thus obtained are shown in Table 2.

Next, a long-fiber-reinforced thermoplastic resin pellet was produced in exactly the same manner as in Example 1 except that the glass composition obtained in present Example was used. The long-fiber-reinforced thermoplastic resin pellet obtained in present Example included the glass fibers in a content of 40% by mass based on the total amount of the pellet, and had a length of 10 mm. When the long-fiber-reinforced thermoplastic resin pellet was produced, the fluffing due to the breakage of the filaments was visually evaluated. The result thus obtained is shown in Table 3.

Next, by using the long-fiber-reinforced thermoplastic resin pellet obtained in present Example, a plate-like long-fiber-reinforced thermoplastic resin compact having the same size as in Example 1 was produced by an injection molding method. By using the long-fiber-reinforced thermoplastic resin compact as a sample, a three-point bending test was performed, and the strength and the modulus of elasticity of the long-fiber-reinforced thermoplastic resin compact were derived. The results thus obtained are shown in Table 3.

Example 4

In present Example, first a glass composition was obtained by mixing glass raw materials in such a way that the content of $SiO_2$ was 61.4% by mass, the content of $Al_2O_3$ was 19.0% by mass, the content of MgO was 12.9% by mass, the content of CaO was 6.5% by mass, the content of $Fe_2O_3$ was 0.1% by mass and the content of $Na_2O$ was 0.1% by mass, based on the total amount of the glass composition. In the glass composition, the ratio of the content of MgO to the content of CaO, MgO/CaO is 2.0. The composition of the glass composition obtained in present Example is shown in Table 1.

Next, the 1000-poise temperature and the liquid phase temperature were determined, and the working temperature range was derived in exactly the same manner as in Example 1 except that the glass composition obtained in present Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, and the resulting molten glass was spun to yield glass fibers. Next, the strength and the modulus of elasticity were derived in exactly the same manner as in Example 1 except that the glass fibers obtained in present Example were used. The results thus obtained are shown in Table 2.

Example 5

In present Example, first a glass composition was obtained by mixing glass raw materials in such a way that the content of $SiO_2$ was 58.0% by mass, the content of $Al_2O_3$ was 21.9% by mass, the content of MgO was 10.0% by mass, the content of CaO was 10.0% by mass and the content of $Fe_2O_3$ was 0.1% by mass, based on the total amount of the glass composition. In the glass composition, the ratio of the content of MgO to the content of CaO, MgO/CaO is 1.0. The composition of the glass composition obtained in present Example is shown in Table 1.

Next, the 1000-poise temperature and the liquid phase temperature were determined, and the working temperature range was derived in exactly the same manner as in Example 1 except that the glass composition obtained in present Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, and the resulting molten glass was spun to yield glass fibers. Next, the strength and the modulus of elasticity were derived in exactly the same manner as in Example 1 except that the glass fibers obtained in present Example were used. The results thus obtained are shown in Table 2.

Next, a long-fiber-reinforced thermoplastic resin pellet was produced in exactly the same manner as in Example 1 except that the glass composition obtained in present Example was used. The long-fiber-reinforced thermoplastic resin pellet obtained in present Example included the glass fibers in a content of 40% by mass based on the total amount of the pellet, and had a length of 10 mm. When the long-fiber-reinforced thermoplastic resin pellet was produced, the fluffing due to the breakage of the filaments was visually evaluated. The result thus obtained is shown in Table 3.

Next, by using the long-fiber-reinforced thermoplastic resin pellet obtained in present Example, a plate-like long-fiber-reinforced thermoplastic resin compact having the same size as in Example 1 was produced by an injection molding method. By using the long-fiber-reinforced thermoplastic resin compact as a sample, a three-point bending test was performed, and the strength and the modulus of elasticity of the long-fiber-reinforced thermoplastic resin compact were derived. The results thus obtained are shown in Table 3.

Example 6

In present Example, first a glass composition was obtained by mixing glass raw materials in such a way that the content of $SiO_2$ was 57.0% by mass, the content of $Al_2O_3$ was 20.0% by mass, the content of MgO was 12.0% by mass, the content of CaO was 10.9% by mass and the content of $Fe_2O_3$ was 0.1% by mass, based on the total amount of the glass composition. In the glass composition, the ratio of the content of MgO to the content of CaO, MgO/CaO is 1.1. The composition of the glass composition obtained in present Example is shown in Table 1.

Next, the 1000-poise temperature and the liquid phase temperature were determined, and the working temperature range was derived in exactly the same manner as in Example 1 except that the glass composition obtained in present Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, and the resulting molten glass was spun to yield glass fibers. Next, the strength and the modulus of elasticity were derived in exactly the same manner as in Example 1 except that the glass fibers obtained in present Example were used. The results thus obtained are shown in Table 2.

Comparative Example 1

In present Comparative Example, a glass composition having a composition (the content of $SiO_2$ was 64.0 to 66.0% by mass, the content of $Al_2O_3$ was 24.0 to 26.0% by mass and the content of MgO was 9.0 to 11.0%) corresponding to so-called S-glass was obtained. The composition corresponding to S-glass does not include CaO at all. Accordingly, in the glass composition, the ratio of the content of MgO to the content of CaO, MgO/CaO cannot be derived.

Next, the 1000-poise temperature and the liquid phase temperature were determined, and the working temperature range was derived in exactly the same manner as in Example 1 except that the glass composition obtained in present Comparative Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, mid the resulting molten glass was spun to yield glass fibers. Next, the strength and the modulus of elasticity of the glass fibers were derived in exactly the same manner as in Example 1 except that the glass fibers obtained in present Comparative Example were used. The results thus obtained are shown in Table 2.

Next, a long-fiber-reinforced thermoplastic resin pellet was produced in exactly the same manner as in Example 1 except that the glass composition obtained in present Comparative Example was used. The long-fiber-reinforced thermoplastic resin pellet obtained in present Comparative Example included the glass fibers in a content of 40% by mass based on the total amount of the pellet, and had a length of 10 mm. When the long-fiber-reinforced thermoplastic resin pellet was produced, the fluffing due to the breakage of the filaments was visually evaluated. The result thus obtained is shown in Table 3.

Next, by using the long-fiber-reinforced thermoplastic resin pellet obtained in present Comparative Example, a plate-like long-fiber-reinforced thermoplastic resin compact having the same size as in Example 1 was produced by an injection molding method. By using the long-fiber-reinforced thermoplastic resin compact as a sample, a three-point bending test was performed, and the strength and the modulus of elasticity of the long-fiber-reinforced thermoplastic resin compact were derived. The results thus obtained are shown in Table 3.

Comparative Example 2

In present Comparative Example, the glass composition having a composition equivalent to so-called E-glass (the content of $SiO_2$ was 52.0 to 56.0% by mass, the content of $Al_2O_3$ was 12.0 to 16.0% by mass, the content of MgO was 0 to 6% by mass, the content of CaO was 16 to 25% by mass, the content of $Na_2O$ was 0 to 0.8% by mass and the content of $B_2O_3$ was 5.0 to 10.0% by mass) was obtained.

Next, the 1000-poise temperature and the liquid phase temperature were determined, and the working temperature range was derived in exactly the same manner as in Example 1 except that the glass composition obtained in present Comparative Example was used. The devitrification resistance was evaluated and the identification of the crystal species of the initial phase of devitrification was performed in exactly the same manner as in Example 1. The results thus obtained are shown in Table 2.

Next, the glass composition was melted into a molten glass, mid the resulting molten glass was spun to yield glass fibers. Next, the strength and the modulus of elasticity were derived in exactly the same manner as in Example 1 except that the glass fibers obtained in present Comparative Example were used. The results thus obtained are shown in Table 2.

Next, a long-fiber-reinforced thermoplastic resin pellet was produced in exactly the same manner as in Example 1 except that the glass composition obtained in present Comparative Example was used. The long-fiber-reinforced thermoplastic resin pellet obtained in present Comparative Example included the glass fibers in a content of 40% by mass based on the total amount of the pellet, and had a length of 10 mm. When the long-fiber-reinforced thermoplastic resin pellet was produced, the fluffing due to the breakage of the filaments was visually evaluated. The result thus obtained is shown in Table 3.

Next, by using the long-fiber-reinforced thermoplastic resin pellet obtained in present Comparative Example, a plate-like long-fiber-reinforced thermoplastic resin compact having the same size as in Example 1 was produced by an injection molding method. By using the long-fiber-reinforced thermoplastic resin compact as a sample, a three-point bending test was performed, and the strength and the modulus of elasticity of the long-fiber-reinforced thermoplastic resin compact were derived. The results thus obtained are shown in Table 3.

TABLE 1

| | Examples | | | | | |
|---|---|---|---|---|---|---|
| | 1 | 2 | 3 | 4 | 5 | 6 |
| $SiO_2$ | 60.2 | 59.2 | 58.2 | 61.4 | 58.0 | 57.0 |
| $Al_2O_3$ | 20.1 | 20.1 | 20.7 | 19.0 | 21.9 | 20.0 |
| MgO | 10.1 | 12.6 | 12.0 | 12.9 | 10.0 | 12.0 |
| CaO | 9.5 | 8.0 | 9.0 | 6.5 | 10.0 | 10.9 |
| $Fe_2O_3$ | 0.1 | 0.1 | 0.1 | 0.1 | 0.1 | 0.1 |
| $Na_2O$ | 0 | 0 | 0 | 0.1 | 0 | 0 |
| $B_2O_3$ | 0 | 0 | 0 | 0 | 0 | 0 |
| MgO/CaO | 1.1 | 1.6 | 1.3 | 2.0 | 1.0 | 1.1 |

TABLE 2

| | Examples | | | | | | Comparative Examples | |
|---|---|---|---|---|---|---|---|---|
| | 1 | 2 | 3 | 4 | 5 | 6 | 1 | 2 |
| 1000-Poise temperature (° C.) | 1343 | 1319 | 1320 | 1349 | 1335 | 1291 | 1470 | 1200 |
| Liquid phase temperature (° C.) | 1238 | 1262 | 1230 | 1293 | 1285 | 1239 | 1465 | 1065 |
| Working temperature range (° C.) | 105 | 57 | 90 | 56 | 50 | 52 | 5 | 135 |
| Devitrification resistance | A | A | A | A | A | A | C | A |
| Initial phase of devitrification | cor/ano | cor | cor | cor | cor/ano | cor | mul | cri |
| Glass fibers Strength (GPa) | 4.1 | 4.0 | 4.1 | 4.1 | 4.0 | 4.0 | 4.6 | 3.3 |
| Modulus of elasticity E (GPa) | 86 | 88 | 87 | 86 | 86 | 87 | 86 | 73 |

Devitrification resistance: A indicates that no crystals precipitate, B indicates that crystals precipitate on a portion of the surface and C indicates that crystals precipitate on the surface and in the interior.

Initial phase of devitrification: cor—cordierite, ano—anorthite, mul—mullite, cri—cristobalite As shown in Table 2, in the molten glass in each of Examples 1 to 6, the 1000-poise temperature was 1350° C. or lower, the difference between the 1000-poise temperature mid the liquid phase temperature was 50° C. or more, and hence the working temperature range was wide. Accordingly, stable spinning can be performed, and hence mass production can be easily performed. In each of Examples 1 to 6, the glass fibers had a strength of 4.0 GPa or more and a modulus of elasticity of 85.0 GPa or more, and hence the long-fiber-reinforced thermoplastic resin pellet including the glass fibers of the present invention resulted in the excellent strength mid the excellent modulus of elasticity of the compact itself.

On the contrary, in Comparative Example 1, the content of $SiO_2$ in the composition of the glass fibers exceeded the upper limit of the present invention, and hence, the 1000-poise temperature was high; in the composition of the glass fibers, the contents of $SiO_2$ and $Al_2O_3$ each exceeded the upper limit of the present invention and CaO was not included, mid hence the liquid phase temperature was high and the working temperature range was narrow. Moreover, the initial phase of devitrification was mullite, and hence the devitrification resistance was low, and it was difficult to stably spin glass fibers. Consequently, in Comparative Example 1, the spinning conditions were severe, and hence Comparative Example 1 was not suitable for mass production of glass fibers, and hence it was difficult to produce a long-fiber-reinforced thermoplastic resin pellet.

In Comparative Example 2, the contents of $Al_2O_3$ and MgO in the composition of the glass fibers were each less than the lower limit of the present invention, and hence the strength and the modulus of elasticity of the glass fibers were low. Accordingly, the long-fiber-reinforced thermoplastic resin pellet including the glass fibers of Comparative Example 2 resulted in the low strength mid the low modulus of elasticity of the compact Itself.

Next, the analysis results of the compacts are shown in Table 3. A compact including the glass fibers of each of Examples 1 to 3 and 5, and Comparative Examples 1 and 2 was prepared, and the strength and the modulus of elasticity of the resulting compact were measured. The fluffing at the time of molding was also visually analyzed.

TABLE 3

| | Examples | | | | Comparative Examples | |
|---|---|---|---|---|---|---|
| | 1 | 2 | 3 | 5 | 1 | 2 |
| Strength (MPa) | 375 | 370 | 360 | 368 | 384 | 306 |
| Modulus of elasticity E (GPa) | 11.3 | 11.5 | 11.4 | 11.3 | 11.4 | 10.6 |
| Fluffing at the time of molding | ○ | ○ | ○ | ○ | ○ | X |

In Table 3, under the heading of the fluffing at the time of molding, the case where no fluffing occurred at the time of molding is marked with ○, and the case where fluffing at the time of molding occurred is marked with X.

In the analysis results, the long-fiber-reinforced thermoplastic resin compacts including the long glass fibers of the present invention each had a strength of 360 GPa or more and a modulus of elasticity E of 11.0 or more, and were able to be produced as the compacts more excellent both in strength and in modulus of elasticity than the compact including long glass fibers of Comparative Example 2.

The long-fiber-reinforced thermoplastic resin compact including the glass composition of Comparative Example 1 was excellent both in strength and in modulus of elasticity. However, as described above, the glass composition of Comparative Example 1 had a high 1000-poise temperature and a high liquid phase temperature, and a narrow working temperature range as shown in Table 1. Moreover, the initial phase of devitrification was mullite, and hence the devitrification resistance was low, and it was difficult to stably span glass fillers. Accordingly, although the foregoing compact was excellent in physical properties such as strength and modulus of elasticity, stable spinning of glass fiber is impossible, and hence it is difficult to mass-produce the foregoing compact.

The long-fiber-reinforced thermoplastic resin compact including the glass composition of Comparative Example 2 was problematic with respect to the strength and the modulus of elasticity. Consequently, in Comparative Example 2, fluffing occurred at the time of pultrusion molding, and hence it was difficult to produce the long-fiber-reinforced thermoplastic resin pellet.

As described above, it is clear that the long-fiber-reinforced thermoplastic resin compact of the present invention has an excellent strength and an excellent modulus of elasticity by being molded by injection molding from the long-fiber-reinforced thermoplastic resin pellet. It is also clear that long-fiber-reinforced thermoplastic resin compact including the glass composition of the present invention is free from the occurrence of fluffing at the time of pultrusion molding and can be easily produced.

The invention claimed is:

1. A long-fiber-reinforced thermoplastic resin preform which is produced by cutting to a predetermined length glass fiber bundles impregnated with a thermoplastic resin and at the same time holding the thermoplastic resin around the glass fiber bundles and which includes the glass fiber bundles as long fiber bundles, wherein the glass fiber bundles impregnated with a thermoplastic resin and at the same time holding the thermoplastic resin around the glass fiber bundles are obtained by a process wherein a glass composition as a raw material for glass fibers is melted into a molten glass, the continuous glass fibers spun from the molten glass are bundled into glass fiber bundles, and a thermoplastic resin is impregnated in the glass fiber bundles and at the same time being held around the glass fiber bundles, wherein the glass fibers have a composition wherein a content of $SiO_2$ is 59.2 to 60.2% by mass, a content of $Al_2O_3$ is 19.0 to 23.0% by mass, a content of MgO is 10.0 to 15.0% by mass and a content of CaO is 10.9 to 11.0% by mass, based on a total amount of the glass fibers, and a ratio of the content of MgO to the content of CaO, MgO/CaO falls within a range from 0.9 to 1.3.

2. The long-fiber-reinforced thermoplastic resin preform according to claim 1, wherein a crystal precipitating first, when the molten glass is decreased in temperature, is a single crystal of cordierite or a mixed crystal composed of cordierite and anorthite.

3. The long-fiber-reinforced thermoplastic resin preform according to claim 1, wherein in the molten glass has a 1000-poise temperature, which is a temperature at which a viscosity of the molten glass is 1000 poises, is 1350° C. or lower, and a difference between the 1000-poise temperature and a liquid phase temperature, which is a temperature at which crystals start to precipitate when the temperature of the molten glass is decreased, is 50° C. or more.

4. The long-fiber-reinforced thermoplastic resin preform according to claim 1, wherein in the glass fibers have a strength of 4.0 GPa or more and have a modulus of elasticity of 85 GPa or more.

* * * * *